United States Patent [19]

Sugiki et al.

[11] Patent Number: 5,738,377
[45] Date of Patent: Apr. 14, 1998

[54] SHOCK ABSORBING PLATE FOR A VEHICLE STEERING WHEEL

[75] Inventors: Akio Sugiki, Brussels, Belgium; Toshiyuki Sasaki, Kariya, Japan

[73] Assignee: Aisin Seiki Kabushiki Kaisha, Kariya, Japan

[21] Appl. No.: 709,033

[22] Filed: Sep. 6, 1996

[30] Foreign Application Priority Data

Sep. 13, 1995 [JP] Japan .................. 7-235259

[51] Int. Cl.$^6$ .................. B62D 1/19
[52] U.S. Cl. .................. 280/777; 188/376; 74/492
[58] Field of Search .................. 280/777, 775, 280/779, 780; 188/376, 371; 74/492, 493

[56] References Cited

U.S. PATENT DOCUMENTS

| | | | |
|---|---|---|---|
| 3,392,599 | 7/1968 | White | 280/777 |
| 3,487,710 | 1/1970 | Fergle | 188/371 |
| 3,973,650 | 8/1976 | Nagazumi | 188/371 |
| 5,052,716 | 10/1991 | Matsumoto | 280/777 |
| 5,211,694 | 5/1993 | Sakakida et al. | 188/376 |
| 5,487,562 | 1/1996 | Hedderly et al. | 280/777 |
| 5,503,431 | 4/1996 | Yamamoto | 280/777 |

FOREIGN PATENT DOCUMENTS

| | | | |
|---|---|---|---|
| 28 21 707 | 11/1978 | Germany | 280/777 |
| 55-68471 | 5/1980 | Japan . | |
| 64-24675 | 2/1989 | Japan . | |
| 1-249573 | 10/1989 | Japan . | |

*Primary Examiner*—Peter C. English
*Attorney, Agent, or Firm*—Sughrue, Mion, Zinn, Macpeak & Seas, PLLC

[57] ABSTRACT

A shock absorbing plate for a vehicle steering column is provided with a first portion for connection to a vehicle structure and the second portion for connection to a steering column which supports a steering wheel. A pair of parallel grooves are formed in the plate to define the second portion of the shock absorbing plate which is torn from the first portion of the shock absorbing plate when an excess force is applied axially to the steering column in order to absorb such excess force by axially moving the steering column relative to the vehicle structure. The shock absorbing characteristics of the shock absorbing plate can be varied by the shape of the grooves.

2 Claims, 4 Drawing Sheets

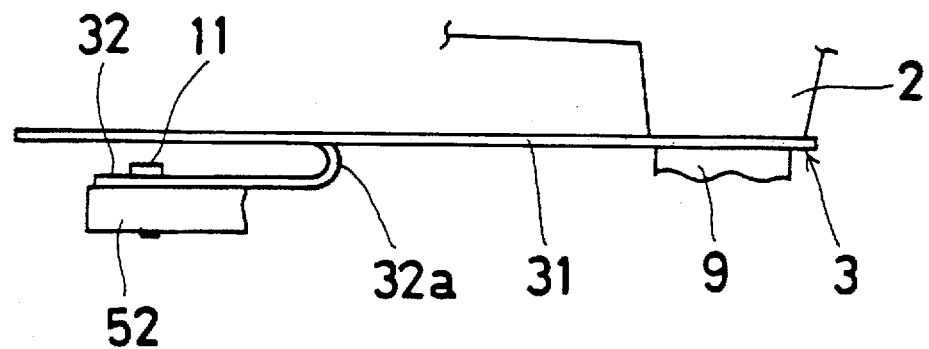
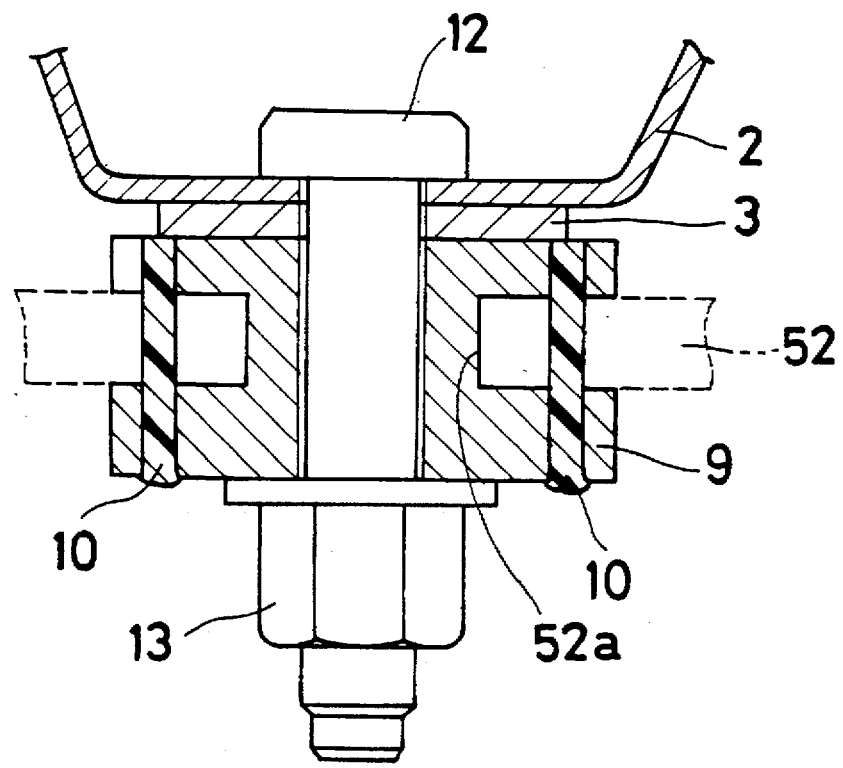

5,738,377

SHOCK ABSORBING PLATE FOR A VEHICLE STEERING WHEEL

FIELD OF THE INVENTION

This invention relates to a shock absorbing plate for a vehicle steering wheel, especially a shock absorbing plate which absorbs excess load applied to a steering wheel by allowing a steering column to move axially relative to the vehicle structure.

BACKGROUND OF THE INVENTION

One example of a shock absorbing member of this kind is disclosed in Japanese patent application laid-open publication No. 1-249573. In this publication, a shock absorbing member is disposed between a vehicle structure and a steering column which rotatably supports a steering wheel. When an excess load is applied to the steering wheel, the shock absorbing member is torn up to allow the steering column to move axially relative to the vehicle structure so that the load on the steering wheel is absorbed. Further, the shock absorbing member has a slit which serves as the point where the shock absorbing member starts tearing off. However, the direction in which the shock absorbing member is torn up depends on the direction of the load. As a result the effect of the shock absorbing member may not be stable.

SUMMARY OF THE INVENTION

Accordingly, it is an object of the present invention to provide a shock absorbing plate without the foregoing drawbacks. It is a further object of this invention to stabilize the shock absorbing characteristics of the plate.

In accordance with the present invention, a shock absorbing plate for a vehicle steering wheel comprises a plate having a first portion adapted to be connected to the vehicle structure and a second portion adapted to be connected to the steering column which supports the steering wheel wherein grooves are formed on the plate. The second portion of the shock absorbing plate will be torn up from the first portion of the shock absorbing plate when an excess load is applied onto the steering wheel in order to absorb such excess load by axially moving the steering column against the vehicle structure.

The direction in which the shock absorbing plate is torn up is determined with the help of the grooves and the shock absorbing characteristics of the steering apparatus are stabilized.

BRIEF DESCRIPTION OF THE DRAWINGS

The foregoing and additional features of the present invention will become more apparent from the following detailed description of a preferred embodiment thereof when considered with reference to the attached drawings, in which:

FIG. 6 is a side view showing a shock absorbing plate of the present invention when an excess load is applied to the steering wheel; and FIG. 7 is a sectional view taken along the line VII—VII of FIG. 2.

DETAILED DESCRIPTION OF THE PREFERRED EMBODIMENT

Figure 1:
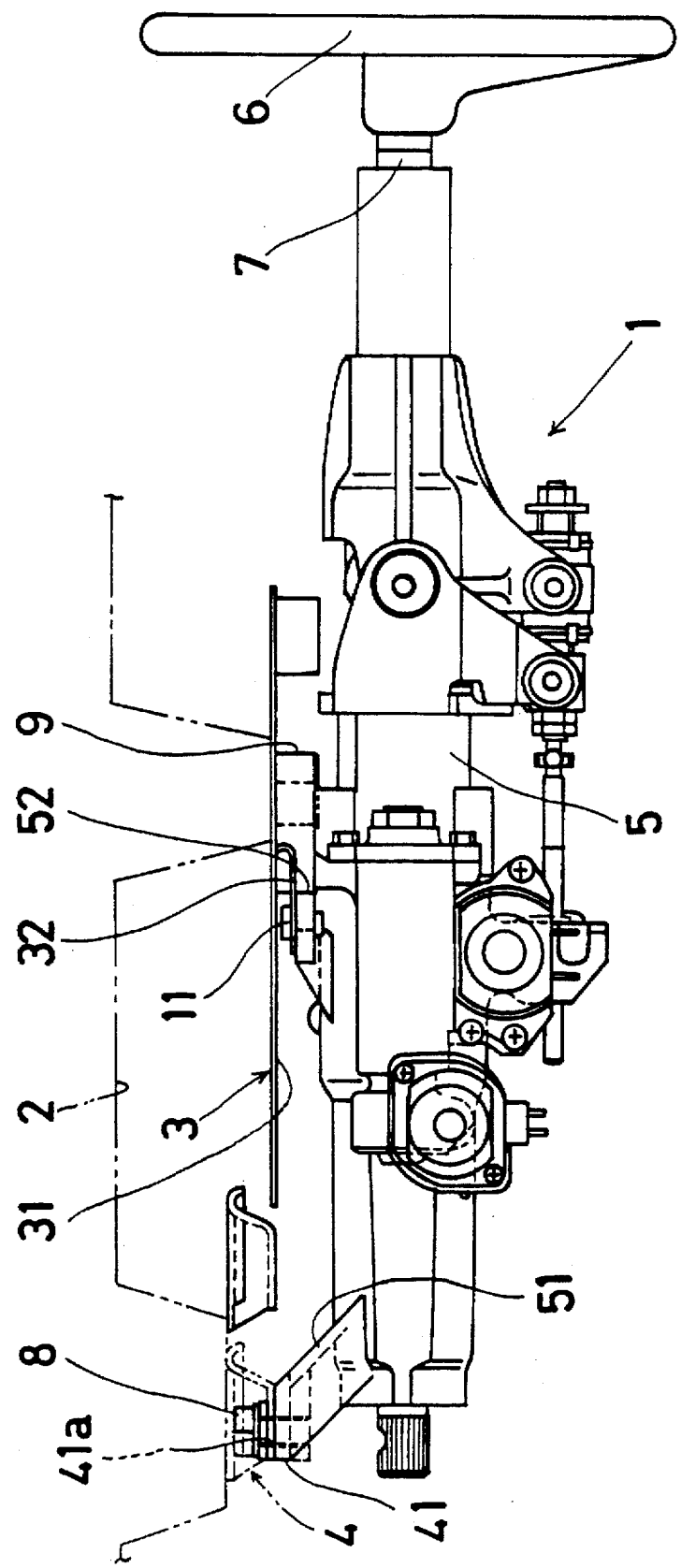
FIG. 1 is a side view of a steering apparatus according to the present invention.
Figure 2:
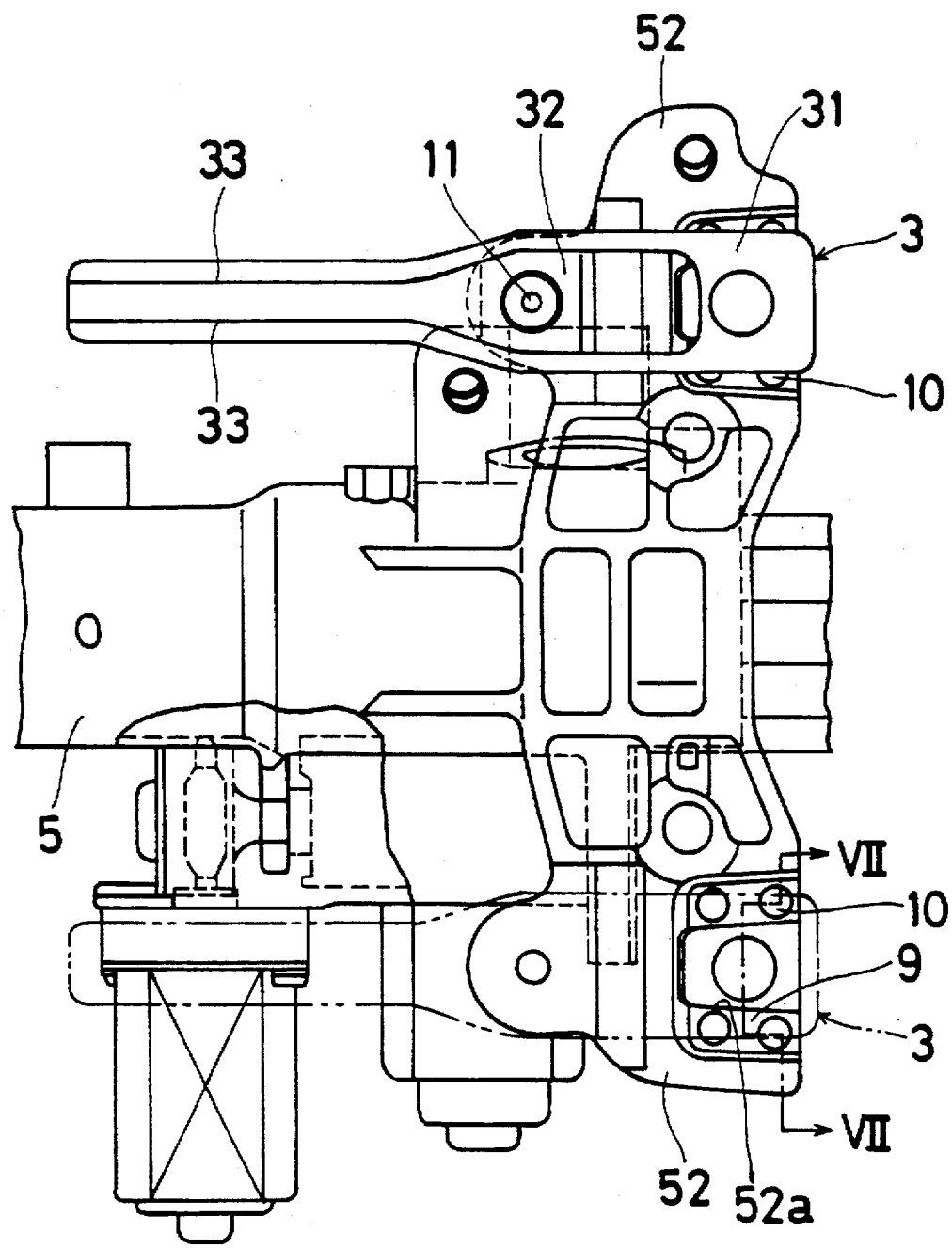
FIG. 2 is a schematic top view of the steering apparatus.

Referring to FIGS. 1 and 2, a steering apparatus 1 for a vehicle is used to steer the front wheels of the vehicle (not shown). The steering apparatus 1 has a steering column 5 which is secured at the middle portion thereof in the axial direction and the front portion (the left end in FIG. 1) by a pair of plates 3, 3 and a supporting bracket 4, respectively. A steering shaft 7 is rotatably supported by the steering column 5 and linked with the front wheels of the vehicle. A steering wheel 6 is fixed on the steering shaft 7. The steering apparatus 1 has a tilt function that adjusts the vertical position of the steering wheel and a telescopic function that adjusts the axial position of the steering wheel. To attain these functions, the steering shaft 7 and steering column 5 are each divided into two sections pivotally connected to each other, respectively.

The supporting bracket 4 is bolted to the vehicle structure 2. At the center of the supporting bracket 4, a securing portion 41 is provided with a hole 41a opening to the left as viewed in FIG. 1. At the front end of the steering column 5, a bolt 8 extends through the hole 41a and is secured with a nut to the arm member 51, secured to the forward end of column 5. In this structure, the supporting bracket 4 enables the steering column 5 to move axially relative to the vehicle structure 2 by having the securing portion 41 frictionally engaged with the arm member 51.

Referring to FIGS. 1 to 4, a pair of plates 3 extend in the axial direction. Each plate 3 has a main portion 31 and a movable portion 32. The main portion 31 of each plate 3 is bolted to the vehicle structure 2 and a support member 9 by a bolt 12 and a nut 13 as shown in FIG. 7. A wing member 52 carried by the column 5 is provided with two cut out recesses 52a opening toward the steering wheel on the steering column 5. Each support member 9 is made of aluminum and inserted into a recess 52a and connected to the wing member 52 by several breakable pins 10. Thus, the support members 9 connect the plates 3 to the vehicle structure 2 and connect the wing member 52 to the vehicle structure 2. When an excess force is applied to the steering wheel 6, the force is applied to move the steering column 5 in the axial direction thereof. When the force breaks the breakable pins 10, the steering column 5 moves in the axial direction relative to the fixed support members 9.

The movable portion 32 of each plate 3 is formed by cutting and bending to provide a reversely bent portion 32a and an opening 31a. The movable portion 32 is secured to the wing 52 on the steering column 5 by a pin 11. A pair of grooves 33 having a V-shaped cross section extend axially in parallel to each other on the surface of the plate 3.

Figure 5:
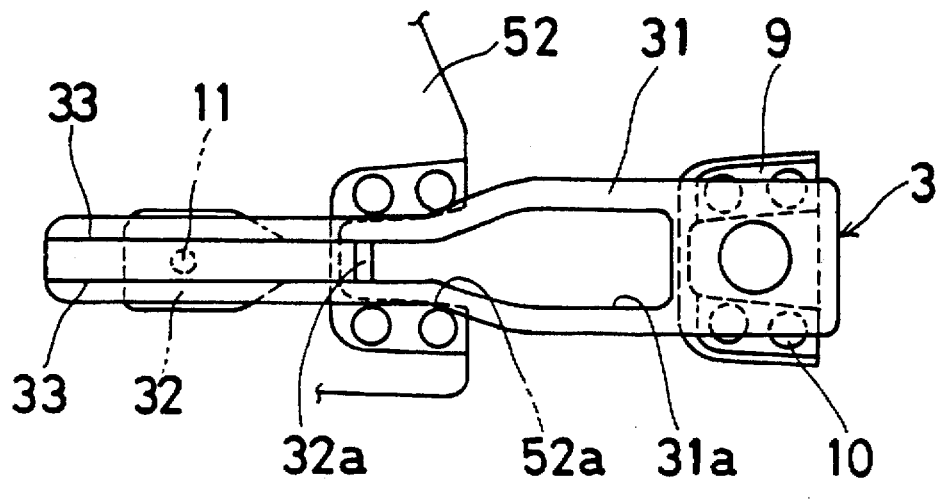
FIG. 5 is a plan view showing a shock absorbing plate of the present invention when an excess load is applied to the steering wheel.

When an axial force over a certain level is applied to the steering wheel 6, as shown in FIGS. 1 and 5, the force is applied to move the steering column 5 in the axial direction. Then the supporting bracket 4 and the arm 51 of the steering column 5 are released from frictional engagement. At the same time, the breakable pins 10 are broken and the support members 9 separate from the recesses 52a in the wing 52. Thus the steering column 5 moves in the axial direction relative to the supporting bracket 4 and support members 9 fixed to the vehicle structure 2. The force is also applied to the bent portion 32a of the movable portion 32 and the bent portion 32a starts moving relative to the main portion 31 by tearing off from the main portion 31 along the grooves 33.

The resistance provided by the tearing and plastic deformation of the portion 32 absorbs the force applied to the steering wheel 6.

The shock absorbing characteristics of the plates 3 can be controlled by changing the thickness of the plates 3, the shape of the cross section of the grooves 33 and the direction of the grooves 33.

Figure 3:
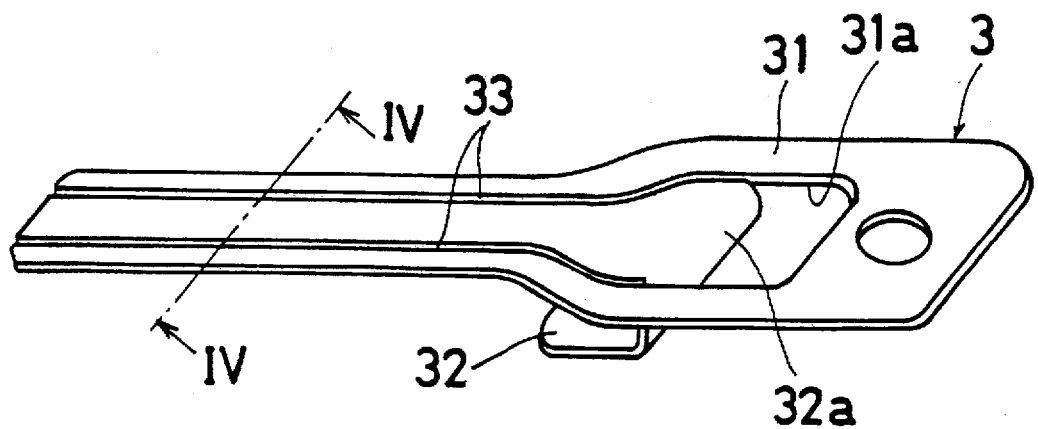
FIG. 3 is a perspective view of a shock absorbing plate of the present invention.
Figure 4:
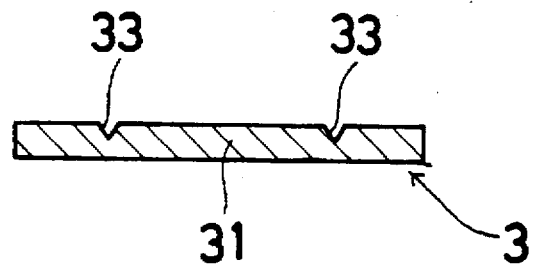
FIG. 4 is a sectional view taken along the line IV—IV of FIG. 3.

The pair of grooves 33 need not be arranged in parallel. As shown in FIG. 3, the grooves 33 are substantially parallel to each other at opposite end portions of the grooves and converge toward each other intermediate the end portions to control the resistance to separation of the movable portion 32 from the main portion 31. The two pairs of grooves 33 can be formed on opposite sides of the plate 3. In the illustrated embodiment, the movable portion 32 is disposed downwardly from the plate 3. However, the movable portion 32 could be connected to the vehicle structure 2 and the main portion 31 could be connected to the wing portion 52 so that the main portion 31 is torn off from the portion 32.

While the invention has been particularly shown and described with reference to preferred embodiments thereof, it will be understood by those in the art that the foregoing and other changes in form and details may be made therein without departing from the spirit and scope of the invention.

What is claimed is:

1. A shock absorbing plate for mounting a vehicle steering column which is movable in an axial direction on a vehicle body comprising:

said plate having a first portion for connection to a vehicle body and a second portion for connection to a steering column; and a pair of grooves formed in the plate and defining the second portion therebetween whereby the second portion may be torn from the first portion when excess force is applied to the steering column in said axial direction;

wherein said grooves are substantially parallel to each other at opposite end portions of the grooves and converge toward each other in said axial direction intermediate said end portions to continue resistance to separation of said second portion from said first portion.

2. A shock absorbing plate as set forth in claim 1, wherein said second portion of the plate has a reversibly bent portion for connection to said steering column.

\* \* \* \* \*